United States Patent
Rebstock et al.

(10) Patent No.: US 6,273,222 B1
(45) Date of Patent: Aug. 14, 2001

(54) BRAKE UNIT INCLUDING BRAKE DISC AND BRAKE LINING

(75) Inventors: Kolja Rebstock, Ulm; Emil Näumann, Ebersbach, both of (DE)

(73) Assignee: Daimler-Benz Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/153,830

(22) Filed: Sep. 15, 1998

(51) Int. Cl.$^7$ ....................................... F16D 69/02
(52) U.S. Cl. .................. 188/251 A; 188/218 XL
(58) Field of Search .................. 188/218 XL, 218 R, 188/251 R, 250 R, 255–259, 251 M, 250 G, 250 B, 71.1, 73.1, 251 A

(56) References Cited

U.S. PATENT DOCUMENTS

| | | | |
|---|---|---|---|
| 4,290,510 | * 9/1981 | Warren | 188/218 XL |
| 5,103,942 | * 4/1992 | Schmitt | 188/251 R |
| 5,509,511 | * 4/1996 | Kwolek | 188/251 A |
| 5,620,791 | 4/1997 | Dwivedi et al. | |

FOREIGN PATENT DOCUMENTS

| | | |
|---|---|---|
| 25 39 847 | 3/1977 | (DE). |
| 42 20 630 | 12/1993 | (DE). |
| 43 22 113 | 12/1994 | (DE). |
| 44 38 455 | 5/1996 | (DE). |
| 197 11 829 | 9/1998 | (DE). |
| 197 11 830 | 10/1998 | (DE). |
| 0 271 965 | 6/1988 | (EP). |
| 0 360 254 | 3/1990 | (EP). |
| 0 515 193 | 11/1992 | (EP). |
| 654 616 | 5/1995 | (EP). |
| 96/10137 | 4/1996 | (WO). |
| 97/41368 | 11/1997 | (WO). |

OTHER PUBLICATIONS

Dollhopf, V. et al., "Entwicklung integraler Leichtbaustrukturen aus Faserkeramik," in: VDI Berichte Nr. 1080, 1994, S. 473–483.

Mühlratzer, August, "Fasterverbundkeramik—Entwicklung und Einsatzmöglichkeigten," in: MAN—Forschen—Planen—Bauen, Aug. 12, 1993, Seiten 48–55.

* cited by examiner

*Primary Examiner*—Matthew C. Graham
(74) *Attorney, Agent, or Firm*—Kenyon & Kenyon

(57) ABSTRACT

A brake unit including a brake disc of a material having a high thermal loading capacity and a brake pad that cooperates with it in tribological fashion. The brake disc is essentially made of a short-fiber reinforced ceramic material, whose thermal conductivity, in particular transversely to the disc surface, is at least 20 W/mK, preferably about 30 to 45 W/mK. The brake disc is combined with a brake pad having an organically bonded matrix. The brake pad may be a conventional series brake pad. The brake unit provides an optimal pairing of a brake disc, having a high thermal loading capacity, with a conventional brake pad in light of a reasonably expected brake pad service life, and in light of other tribological requirements, such as the friction coefficient.

25 Claims, 3 Drawing Sheets

BRAKE UNIT INCLUDING BRAKE DISC AND BRAKE LINING

FIELD OF THE INVENTION

The present invention relates to a brake unit including a brake disc of a material having a high thermal loading capacity and a brake pad that cooperates with it in tribological fashion.

RELATED TECHNOLOGY

Brake discs are described, for example, in German Patent Application Nos. 44 38 455 and 43 22 113. German Patent Application No. 43 22 113 describes a brake disc having a metal bearing member with layers of a material capable of withstanding high thermal stresses applied thereon. To prevent the brake pad from being damaged by excessive heating of this area, provision is made, on the one hand, for a metal filling in the ceramic to dissipate the heat acting on the metallic bearing member and, and the other hand, for a ventilated brake pad design.

It is, nevertheless, necessary that the friction member, i.e., the friction pad that cooperates in tribological fashion with the brake disc, be thermally stable. The lower specific thermal capacity and poorer thermal conductivity of ceramic in comparison to the higher thermal capacity of grey cast iron brake discs can cause considerable heat to be generated due to the frictional heat being released. The brake disc easily withstands these temperatures due to its temperature stability. However, a conventional brake pad would disintegrate.

Due to the high temperatures that arise in the area of contact with the brake pad, conventional, industrial brake pads having organic binding systems are, on the whole, not suited for use with brake discs of this kind. The organic binder decomposes in response to the observed temperatures, so that the pad wears away very quickly. Therefore, efforts are underway to develop new kinds of brake pads. Such a new kind of brake pad having a sintered-powder metal base is known from German Patent Application No. 197 11 830.5. It is costly, however.

SUMMARY OF THE INVENTION

Therefore, an object of the present invention is to provide a brake unit of the type including a brake disc of a material having a high thermal loading capacity and a brake pad that cooperates with it in tribological fashion, which combines a brake disc having a thermal load capacity with a suitable brake pad capable of withstanding thermal stresses in a way that enables conventional brake pads to be used as well.

The present invention provides a brake disc essentially made of a short-fiber reinforced ceramic material, whose thermal conductivity, in particular transversely to the disc surface, is at least 20 W/mK, preferably 30 to 45 W/mK, and by combining the brake disc with a brake pad having an organically bonded matrix.

The increased or more uniform thermal conductivity may be attributed to the use of short fibers, which may be oriented in any desired spatial direction.

The present invention represents an optimal pairing of brake disc and brake pad under conditions of an enhanced thermal load-bearing capacity on the part of the brake disc in light of a reasonably expected brake-pad service life, and in light of other tribological requirements, such as friction coefficient level and/or the temperature dependence of the friction coefficient.

The thermal conductivity may be adjusted in every brake disc direction. Initially preferred is an adjustment orthogonally to the disc surface. This ensures, particularly when working with ventilated brake discs, that the frictional heat being released is dissipated over the shortest path.

The thermal conductivity may also be set, however, in parallel with the disc surface. This distributes the frictional heat over the disc and prevents a concentrically disposed region of especially high temperatures from forming in the area of contact with the brake pad and from damaging the brake pad.

The thermal conductivity is calculated to ensure that observed temperatures, even when working with unventilated brake discs, do not rise substantially above about 500° celsius, or to ensure that the brake fluid is heated to levels below about 200° celsius. Preferred however, are ventilated brake discs, whose thermal conductivity is comparable to that of gray cast iron.

Due to the relatively high thermal conductivity of a brake disc according to the present invention, in particular transversely to the brake surface, the temperatures that arise in the area of contact with the brake pad are not substantially more than 500° celsius, in spite of the high stress the brake is subject to. Surprisingly, even commercial brake pads having organic binders can withstand these temperatures, at easily justifiable rates of wear. These generally known pads are usually used for gray cast iron brake discs, which, on the one hand, have a higher thermal conductivity than traditional ceramic and which, on the other hand, have a substantially lower thermal load-bearing capacity than ceramic. The fact that a conventional brake pad is able to be used in a manner that promises success even under the completely changed marginal conditions was not to be expected by one skilled in the art.

It is, however, beneficial for the thermal conductivity of the brake disc to be adjusted for the most part isotropically. The directionally dependent differences in the thermal conductivity should preferably be less than 40% in terms of the highest value. This prevents local temperature peaks from being able to form, which could damage the organically bonded friction pad and, thus, shorten its service life.

A brake disc according to the present invention is preferably a short-fiber reinforced C/SiC ceramic brake disc. This material is certainly known to one skilled in the art and is described, for example, in the German Patent Application No. 197 11 829.1. This material is extremely temperature-stable and can, nevertheless, be combined according to the present invention with a brake pad having an organically bonded matrix.

It is advantageous for a brake disc of the present invention to be made of short-fiber reinforced C/SiC ceramic having isotropically oriented short fibers. In one embodiment of the present invention, the brake disc is made of a short-fiber reinforced composite ceramic having highly heat-resistant fibers, which are bonded by reaction to a silicon-based matrix, short fiber bundles being embedded as randomly distributed bundles in the matrix. The short-fiber bundles are made of bunched individual fiber filaments, with the individual filaments being mostly maintained. They are surrounded at least in their edge area by a coating of carbon, which has reacted completely or partially with the matrix material.

The thermal conductivity or the isotropic quality may be adjusted by varying the homogeneity of the material. A multidirectional, random arrangement of the short-fiber bundles to bridge over the regions of less thermal conductivity, above all at phase boundaries, is desirable. In this manner, thermal conductivity values comparable to those of gray cast iron are obtained. The more pores and/or pure silicon is contained in the material, the lower the thermal conductivity is. The existence of air-filled pores likewise generally degrades thermal conductivity. If many silicon-filled pores are present, the result can be structural anomalies and cracking.

Isotropy is achieved by using short carbon fiber bundles, as described in German Patent Application No. 197 11 829, and by homogeneously mixing the parent substances. The fiber bundles are present in any desired orientation, thus in an isotropic arrangement.

A brake disc according to the present invention preferably contains about 35–45% by volume of fibers, about 40–50% by volume of silicon carbide (from converted graphite material of the C/C member subjected to the siliconization), and maximally about 15% by volume of free silicon. There are preferably no air-filled pores.

A brake pad according to the present invention is advantageously provided with a rear metallic plate. The combination of an organic brake pad, having a high thermal conductivity, with a rear ceramic plate is likewise possible and enhances the stability and load-bearing capacity of a brake unit according to the present invention. In this case, the rear ceramic plate prevents the temperature from being dissipated from the brake pad to the brake piston and, thus, to the brake fluid.

The brake pad can also have a roughly 35% hard-particle content. These hard particles can be ceramic, in particular metal-carbides. The hard material particles preferably exist in powder form prior to the processing. Especially preferred are silicon carbide, titanium carbide, boron carbide, aluminum oxide or glass. In addition, lubricants, in particular solid lubricants, such as molybdenum sulphide, calcium fluoride or graphite may also advantageously be present.

As organic binders, preceramic polymers can also be used, such as compounds from the groups of vinyl resins, polysilanes, polysilazanes, polyborosilanes, polycarbosilanes, polyborocarbosilanes or polyborocarbosilazanes.

BRIEF DESCRIPTION OF THE DRAWINGS

An exemplary embodiment of the present invention is elucidated in the following on the basis of the drawings, in which.

DETAILED DESCRIPTION

Figure 3:
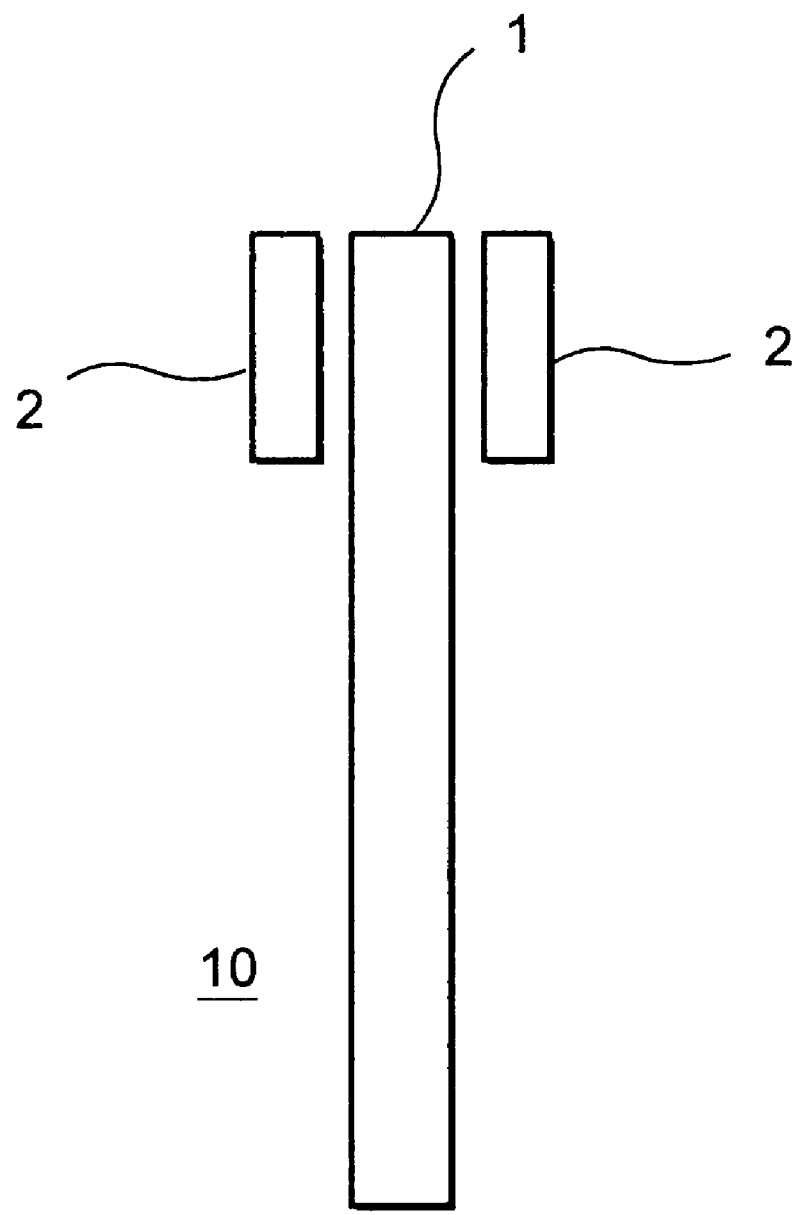
FIG. 3 shows a brake unit having a brake disc and two brake pads.

As shown in FIG. 3, brake unit 10 includes a brake disc 1 and one or two brake pads 2.

The exemplary embodiment includes a brake disc of C/SiC ceramic. The diameter is 285 mm. The brake disc is made of about 40% by volume of C-fibers, 50% by volume of SiC and 10% by volume of silicon. The measure of variation of the thermal conductivity in the axial, radial, and circumferential direction was approximately 30–45 W/mK. The tested brake pad was a passenger-car-series brake pad having a surface area of 86×60 mm of the following composition: about 30–40% by weight of metals in the form of steel wool and copper powder in about the same concentrations, 25–30% by weight of fillers, namely 1–1.5% by weight of $Al_2O_3$, 6–7% by weight mica power, 9–10% by weight of heavy barium sulphate, and 9–11% by weight of iron oxide, 25–30% by weight of lubricant, namely 5–7% by weight of $SbS_3$, 3–5% by weight of graphite and 15–17% by weight of coke powder, as well as an organic content of about 10–12% by weight, namely 1–2% by weight of aramide fiber, 3–5% by weight of resin filler powder, and 5–6% by weight of binding resin. The composition of series brake pads is also generally known. The brake pad was mounted on a rear metallic plate. The brake test was performed on a brake test stand at a brake pressure of 10 bar and a velocity of 60–200 km/h.

Figure 1:
FIG. 1 shows a light-microscopic, micro-structural image according to a brake disc of the present invention made of a C/SiC ceramic.
Figure 2A:
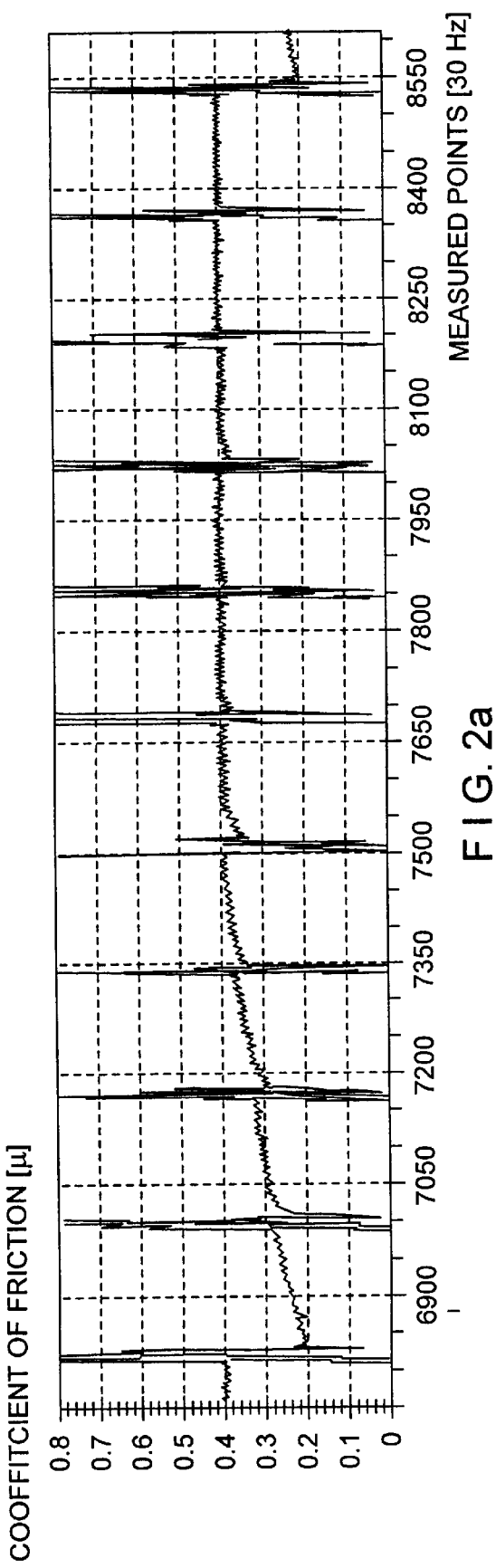
FIGS. 2a and 2b show a test stand diagram showing the curve characteristic of the coefficient of friction (FIG. 2a) and the temperature curve (FIG. 2b) in the disc center, a brake disc according to FIG. 1 and a conventional organic friction pad being used.
Figure 2B:
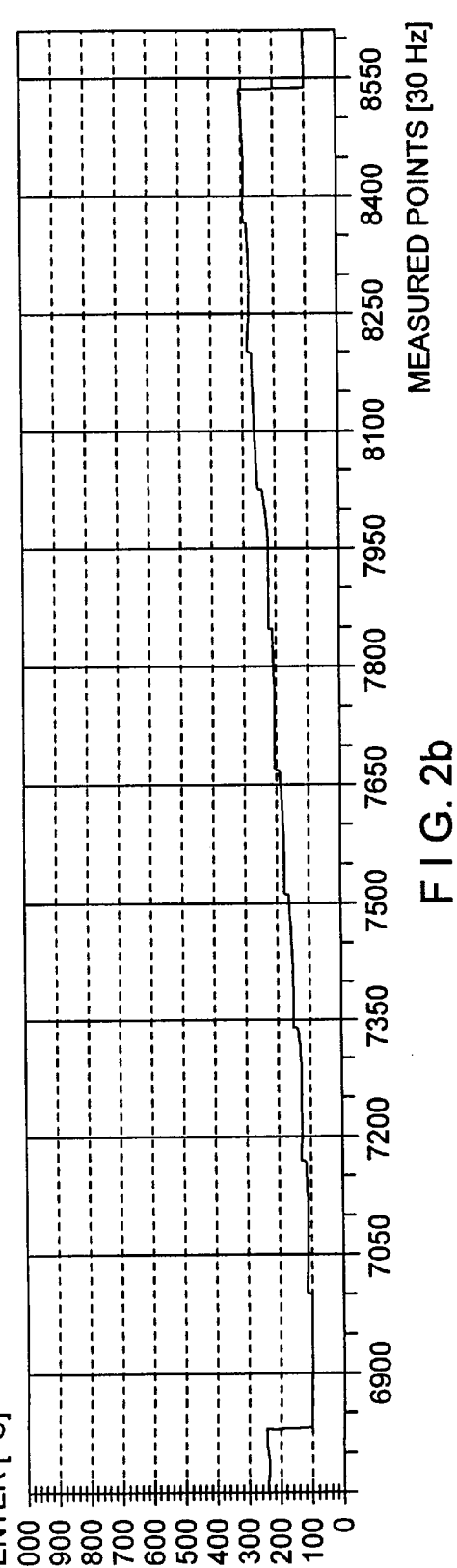

The coefficient of friction measured was between 0.2 and 0.4, as shown in FIG. 2a. The temperature remained under 300° C., as shown in FIG 2b. The wear measured at an application pressure of 10 bar was 1–1.5 g.

What is claimed is:

1. A brake unit comprising:
   a brake disc made substantially of a ceramic material and short fibers forming a short-fiber reinforced ceramic material, the brake disc having a high thermal loading capacity and the short fibers and ceramic material being formed so as to provide a thermal conductivity of at least 20 W/mK; and
   a brake pad cooperating with the brake disc in tribological fashion and including an organically bonded matrix.

2. The brake unit as recited in claim 1 wherein the ceramic material and the short fibers comprise at least about 85% by volume of the brake disc.

3. The brake unit as recited in claim 1 wherein the thermal conductivity of the brake disc of at least 20 W/mK is transversely to the disc surface.

4. The brake unit as recited in claim 1 wherein the thermal conductivity of the brake disc is about 30 to 45 W/mK.

5. The brake unit as recited in claim 1 wherein the thermal conductivity of the brake disc transversely to a surface of the brake disc is about 30 to 45 W/mK.

6. The brake unit as recited in claim 1 wherein the thermal conductivity of the brake disc is at least primarily isotropic.

7. The brake unit as recited in claim 6 wherein directionally dependent differences in the thermal conductivity are less than 40% of a highest value of the thermal conductivity.

8. The brake unit as recited in claim 1 wherein the ceramic material is a silicon-carbide ceramic and the fibers include carbon fibers.

9. The brake unit as recited in claim 8 wherein the ceramic material is essentially homogeneous.

10. The brake unit as recited in claim 8 wherein the fibers include substantially isotropically arranged fibers or fiber bundles.

11. The brake unit as recited in claim 8 wherein the ceramic material is essentially non-porous.

12. The brake unit as recited in claim 8 wherein the brake disc includes about 35–45% by volume of carbon fibers, about 40–50% by volume of silicon carbide, and at most about 15% by volume of free silicon.

13. The brake unit as recited in claim 1 wherein the brake pad is a conventional organically bonded series pad.

14. The brake unit as recited in claim 1 wherein the brake pad includes hard particles of up to about 35% by weight of the brake pad.

15. The brake unit as recited in claim 14 wherein the hard particles include a ceramic.

16. The brake unit as recited in claim 14 wherein the hard particles include at least one carbide.

17. The brake unit as recited in claim 16 wherein the at least one carbide is at least one of silicon carbide, titanium carbide and boron carbide.

18. The brake unit as recited in claim 14 wherein the hard particles include aluminum oxide.

19. The brake unit as recited in claim 14 wherein the hard particles include glass.

20. The brake unit as recited in claim 1 wherein the brake pad includes lubricants.

21. The brake unit as recited in claim 1 wherein the brake pad includes at least one solid lubricant.

22. The brake unit as recited in claim 21 wherein the at least one solid lubricant is at least one of molybdenum sulphide, calcium fluoride and graphite.

23. The brake unit as recited in claim 1 wherein the brake pad includes binders, the binders including preceramic polymers including at least one of vinyl resins, polysilanes, polyborosilanes, polycarbosilanes, polyborosilazanes, polyborocarbosilanes, polyborocarbosilazanes and polysilazanes.

24. The brake unit as recited in claim 1 wherein the brake pad includes a rear metallic plate.

25. The brake unit as recited in claim 1 wherein the brake pad has a high thermal conductivity and includes a rear ceramic plate.

* * * * *